United States Patent
Bernard et al.

(10) Patent No.: US 8,247,482 B2
(45) Date of Patent: Aug. 21, 2012

(54) HYDROPHILIC POLYISOCYANATE COMPOSITIONS BASED ON PHOSPHATE ESTERS

(75) Inventors: Jean-Marie Bernard, Saint-Laurent d'Agny (FR); Philippe Olier, Lyons (FR)

(73) Assignee: Perstorp France, Saint-Priest (FR)

( * ) Notice: Subject to any disclaimer, the term of this patent is extended or adjusted under 35 U.S.C. 154(b) by 0 days.

(21) Appl. No.: 12/743,478

(22) PCT Filed: Nov. 17, 2008

(86) PCT No.: PCT/FR2008/052065
§ 371 (c)(1),
(2), (4) Date: Jun. 4, 2010

(87) PCT Pub. No.: WO2009/071784
PCT Pub. Date: Jun. 11, 2009

(65) Prior Publication Data
US 2010/0256286 A1    Oct. 7, 2010

(30) Foreign Application Priority Data
Nov. 20, 2007   (FR) ..................... 07 59173

(51) Int. Cl.
*C08G 18/77*   (2006.01)
(52) U.S. Cl. ............... 524/115; 427/385.5; 526/310; 528/44; 528/45; 528/68
(58) Field of Classification Search ............ 524/115
See application file for complete search history.

(56) References Cited

U.S. PATENT DOCUMENTS
2008/0044578 A1 *   2/2008   Bernard et al. ............ 427/385.5

FOREIGN PATENT DOCUMENTS
| WO | WO 97/31960 | 9/1997 |
| WO | WO 97/38968 | * 10/1997 |
| WO | WO 98/56843 | 12/1998 |
| WO | WO 02/22703 | 3/2002 |
| WO | WO 2006/067326 | * 6/2006 |

* cited by examiner

*Primary Examiner* — Doris Lee
(74) *Attorney, Agent, or Firm* — Eckert Seamans Cherin & Mellott, LLC

(57) ABSTRACT

The invention relates to a composition comprising at least one (poly)isocyanate and at least one surfactant comprising an amino acid and a mixture of compounds of formulae (I) and (II) wherein i and j independently represent 0 or 1; and $R_1$ et $R_2$ are identical or different and independently represent a hydrocarbonated chain. Said mixture of compounds of formulae (I) and (II) is characterized in that the molar ratio between compound (II) and compound (I) is higher than 1.

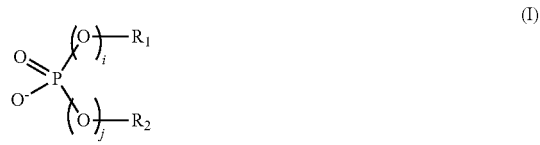

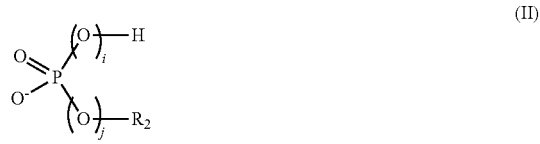

16 Claims, No Drawings

HYDROPHILIC POLYISOCYANATE COMPOSITIONS BASED ON PHOSPHATE ESTERS

CROSS-REFERENCE TO RELATED APPLICATIONS

The present application is a 35 U.S.C. 371 National Stage Application of International Application No. PCT/FR2008/052065, International Filing Date: Nov. 17, 2008, which claims priority under 35 U.S.C. §119(a) to France Application No. 07 59173, Filing Date: Nov. 20, 2007, each of which are incorporated herein by reference in its entirety.

The present invention relates to new phosphate ester-based hydrophilic polyisocyanate compositions, the process for the preparation thereof and the use thereof to prepare coatings, in particular paints or varnishes.

The fields of application in which coatings are used are very varied and increasingly call for high-tech coating compositions having excellent qualities with regard to both the application of the coating and the characteristics of the finished product.

There is incessant demand for coatings having improved properties, in particular which those dry more quickly, are more resistant to impact and shock, exhibit improved behaviour against all types of chemical, organic, microbial or atmospheric attacks as well as improved resistance to pressure washing, in particular for substrates made of plastics materials.

International application WO 97/31960 in the name of the Applicant company describes mixtures of monoesters and diesters of ethoxylated phosphate.

Furthermore, international application WO 98/56843 describes a polyisocyanate-based composition comprising triethylamine and a mixture of mono- and di-(2-ethylhexyl) phosphate with 40% molar weight monoester as well as a polyisocyanate-based composition comprising triethylamine and a mixture of mono- and di-(2-ethylhexyl)phosphate with 40% molar weight monoester.

The object of the present invention is to provide new polyisocyanate compositions which make it possible to obtain coatings which have satisfactory properties with regard to homogeneity and shine.

The object of the present invention is to provide new polyisocyanate compositions which, once applied to a substrate, will make it possible to obtain a coating having a protective or aesthetic function.

The present invention relates to compositions comprising:
at least one (poly)isocyanate and
at least one surfactant comprising an amine and a mixture of compounds based on the following formulae (I) and (II):

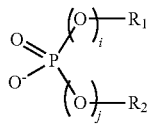

(I)

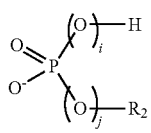

(II)

in which:
i and j represent, independently, 0 or 1;
$R_1$ and $R_2$ are the same or different and represent, independently, a hydrocarbon chain advantageously selected from $C_6$-$C_{30}$ aryl groups and $C_1$-$C_{20}$ alkyl groups, optionally substituted, advantageously $C_4$-$C_{10}$ alkyl groups, optionally with at least one halogen, in particular a fluorine.
said mixture of compounds of formulae (I) and (II) being characterised in that the molar ratio between compound (II), i.e. the monoester-type compound, and compound (I), i.e. the diester-type compound, is greater than 1, preferably from 1 to 10 and advantageously from 2 to 6.

The compositions according to the invention are referred to hereinafter as phosphate ester-based hydrophilic polyisocyanate compositions.

The choice of a specific monoester/diester molar ratio is beneficial since it ensures that a film with a good appearance and increased shine is achieved, said film being obtained by mixing said hydrophilic polyisocyanate compositions with a water-dispersible polyol or polyurethane (PUD), optionally in the presence of a solvent.

The composition of (poly)isocyanates comprised in the composition according to the present invention consists completely of isocyanate and polyisocyanate, alone or in combination with one or more other isocyanates and/or polyisocyanates. The term "(poly)isocyanate" is to be understood in this case as encompassing the terms "isocyanate" and "polyisocyanate".

The surfactant is advantageously selected in such a way that it comprises no or few functions which are reactive with the (poly)isocyanate. In other words, the surfactant is present in the solvent-based composition in a substantially free form (in contrast with a form bonded by means of a chemical bond to the (poly)isocyanate).

The term "substantially free form" means that less than 50%, advantageously less than 20%, preferably less than 10% by weight of the surfactant is in a bonded form.

However, compositions in the form of a solution in which the surfactant is completely bonded in a covalent manner to the (poly)isocyanate are also included within the scope of the present invention.

An advantageous composition according to the present invention comprises a surfactant in which the amine is an amine of the following formula (III):

(III)

in which $R_3$, $R_4$ and $R_5$ represent, independently, H or a hydrocarbon chain, advantageously selected from $C_6$-$C_{30}$ aryl groups and $C_1$-$C_{20}$ alkyl groups, optionally substituted, in particular with at least a halogen, preferably a fluorine, said alkyl groups being cyclic, linear or branched,
the groups $R_3$, $R_4$ and $R_5$ optionally comprising at least one alkylene oxide group and preferably at least one ethylene oxide group.

It is also possible that the $R_3$, $R_4$ and $R_5$ groups form cyclic structures. $R_3$ and $R_4$ or $R_4$ and $R_5$ or $R_3$ and $R_5$ may thus together form a cyclic structure formed preferably of 3 to 5 carbon atoms and optionally containing at least one heteroatom preferably selected from oxygen or sulphur. N-ethyl morpholine, N-methyl morpholine and 1,2,2,6,6-pentamethylpiperidine are examples of cyclic structures of this type.

Advantageously, in the aforementioned formula (III), $R_3$, $R_4$ and $R_5$ represent, independently, a $C_6$-$C_{30}$ aryl group or a $C_1$-$C_{20}$ alkyl group. N,N-dimethylcyclohexylamine, ethyldiisopropylamine, dimethylbutylamine, dimethylbenzylamine, etc. are examples of amines which may be suitable within the scope of the invention.

This embodiment relates to hydrophobic amines. Amines of this type therefore do not contain an alkylene oxide group.

According to another advantageous embodiment, the composition as defined above comprises an amine of formula (III) in which at least one of the groups $R_3$, $R_4$ and $R_5$ comprises at least one alkylene oxide group, preferably at least one ethylene oxide group.

According to a further advantageous embodiment, the composition as defined above comprises an amine of the following formula (III-1):

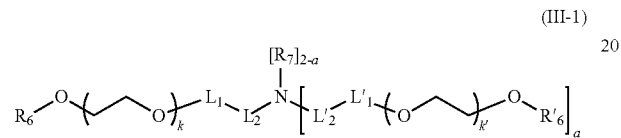

(III-1)

in which:
- a is equal to 0, 1 or 2;
- $R_7$ represents a hydrogen atom or a hydrocarbon chain, advantageously selected from the $C_1$-$C_{20}$ cyclic or non-cyclic alkyl groups, preferably from the $C_1$-$C_4$ alkyl groups, or from the aryl groups comprising from 6 to 30 carbon atoms; and when a=0, the $R_7$ groups may be the same or different and may optionally form a cyclic structure comprising from 3 to 5 carbon atoms;
- $R_6$ and $R'_6$ are the same or different and represent a hydrogen atom or a hydrocarbon chain, advantageously selected from the $C_1$-$C_{20}$ alkyl groups, preferably from the $C_1$-$C_4$ alkyl groups, or from the aryl groups comprising from 6 to 30 carbon atoms;
- k represents an integer greater than or equal to 1, preferably greater than or equal to 2, advantageously from 5 to 60, preferably from 5 to 40;
- k' represents an integer advantageously from 0 to 60, preferably from 5 to 40;
- $L_1$ and $L'_1$ are the same or different and represent, independently, a radical of formula -[-L'-O-]$_t$-, t representing an integer from 0 to 20 and L representing a linear or branched alkylene radical comprising from 3 to 10 carbon atoms, L' preferably representing a —CH(CH$_3$)—CH$_2$— or —(CH$_2$)$_4$— radical, the t L' groups being the same or different;
- $L_2$ and $L'_2$ are the same or different and represent, independently, a linear or branched divalent alkylene radical advantageously comprising from 1 to 20 carbon atoms and preferably representing a —CH(CH$_3$)—CH$_2$— or —CH$_2$—CH(CH$_3$)— radical.

According to a further embodiment, the composition of the invention comprises a polyamine of the following formula (V):

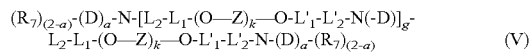

(V)

in which:
- D represents H or $R_6$—(O—Z)$_k$—O-$L_1$-$L_2$- or $R_7$,
- Z represents an alkylene residue, optionally substituted, comprising from 2 to 6 carbon atoms, Z preferably being an ethylene group,
- g represents an integer from 0 to 5, preferably from 0 to 2,
- a, k, $R_6$, $R_4$, $L_1$, $L_2$, $L'_1$ and $L'_2$ are as defined above for formula (III-1).

The amine of the composition of the present invention is preferably based on the following formula (A):

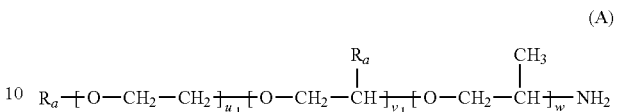

(A)

in which:
- $u_1$ represents an integer, preferably greater than or equal to 2, advantageously from 5 to 60, preferably from 5 to 40,
- $v_1$ represents an integer from 0 to 30, preferably from 0 to 10,
- w represents an integer from 1 to 30, preferably from 1 to 10,
- $R_a$ represents an alkyl group comprising from 1 to 20 carbon atoms, in particular a methyl group or an alkyl group comprising from 12 to 14 carbon atoms, all the $R_a$ groups being the same or different.

The amines preferred within the scope of the present invention are as follows:
- an amine of formula (A) in which $V_1$ is not 0, $R_a$ represents a $C_{12}$-$C_{14}$ alkyl radical with an ethylene oxide/propylene oxide ratio ($u_1$/w) equal to 9/2 (this amine is called Jeffamine® XTJ 247 and has a molecular weight of approximately 700); or
- an amine of formula (A) in which $v_1$ is not 0, $R_a$ represents a methyl group with an ethylene oxide/propylene oxide ratio ($u_1$/w) equal to 12/2 (this amine is called Jeffamine® XTJ 581 and has a molecular weight of approximately 730).

The composition according to the invention particularly advantageously contains a mixture of compounds based on the following formulae (I-1) and (II-1):

(I-1)

(II-1)

$R_1$ and $R_2$ being as defined above for formulae (I) and (II).

A preferred composition according to the present invention comprises from 3 to 30% by weight surfactant and from 70 to 90% by weight (poly)isocyanate.

These values make it possible to obtain an emulsion suitable for the various applications envisaged.

According to another advantageous embodiment, the composition according to the present invention comprises from 5 to 25% by weight, preferably from 8 to 20% by weight, surfactant.

This preferred surfactant range further improves the properties of the films obtained from the hydrophilic polyisocyanate compositions of the invention.

The present invention also relates to a composition as defined above, in which the amount of amine used corresponds to the total neutralisation of the first acidity of the mixture of compounds.

It is preferable to try to obtain a satisfactory rate of neutralisation which corresponds to total neutralisation of the first acidity of the mixture of compounds (I) and (II). This makes it possible to further improve the properties of films obtained from the hydrophilic polyisocyanate compositions of the invention.

It is thus preferred to use a mole of amine for a mole of acidic functions (corresponding to the first acidity carried by the monoesters, diesters and phosphoric acid).

If the first acidity is not completely neutralised, this may lead to problems with regard to the stability of the isocyanate. Secondary reactions may take place between the NCO groups and the OH groups corresponding to the first free acidity of the monoester or the phosphoric acid which leads to a decrease in the NCO content of the composition and a change in viscosity. In order to avoid these problems, neutralisation at least greater than 50% of the first acidity is generally preferred, preferably greater than 90% of the first acidity and even more preferably greater than 110% of the first acidity.

In order to determine the concentrations of monoester, diester and $H_3PO_4$ from the evaluation of the acid values, the process implemented for assaying phosphate esters using a potassium or sodium hydroxide solution will be described hereinafter.

Acid value means the number of milligrams of potassium hydroxide necessary to neutralise 1 g of product. This value is generally obligatorily given in mg or KOH, irrespective of the titrant used. The method for measuring this value is described hereinafter.

According to a preferred embodiment, the (poly)isocyanate of the composition as defined above is a (poly)isocyanate selected from the products of homo- or hetero-condensation of alkylene diisocyanate, in particular comprising products of the biurate and trimer type, even prepolymers with an isocyanate function, in particular comprising urea, urethane, allophanate, ester, amide, acylurea, isocyanurate, oxadiazinetrione, imino-dimer, imino-trimer (imino-triazinedione), imino-oxadiazinedione (also known as an asymmetric trimer) and diazetidinedione (also known as a dimer) functions, and mixtures thereof.

The polyisocyanate compounds may also comprise true carbonate functions (R—O—C(=O)—NH$_2$) or epoxy functions or (preferably cyclic) carbonate functions.

They may, for example, be polyisocyanates sold by Rhodia under the name "Tolonate®".

The polyisocyanates which were used to prepare water-dispersible polyisocyanate compositions have an NCO titre generally comprised between 5 and 25%.

Specific monoisocyanates may be used to prepare water-dispersible polyisocyanate compositions in order to modify particular properties. An example of monoisocyanates of this type are the isocyanate propyl trialkoxysilanes.

Other polyisocyanates with an NCO functionality greater than 2 may also be used to prepare hydrophilic polyisocyanate compositions. Lysine diisocyanate isocyanatoethyl is another example which reduces the viscosity of the final polyisocyanate compositions.

It is also possible to use (poly)isocyanates as defined above which are also rendered hydrophilic by grafting a suitable hydrophilic additive.

Generally, preferred (poly)isocyanates are (poly)isocyanates which are obtainable and generally obtained by homo- or hetero-condensation of aliphatic isocyanate monomers, (cyclo or aryl) aliphatic monomers, selected from the group consisting of the following monomers:
1,6-hexamethylene diisocyanate,
1,12-dodecane diisocyanate,
cyclobutane-1,3-diisocyanate,
cyclohexane-1,3 and/or 1,4-diisocyanate,
1-isocyanato-3,3,5-trimethyl-5-diisocyanatomethylcyclohexane (isophorone diisocyanate, IPDI),
isocyanatomethyloctylenediisocyanates (TTI),
2,4 and/or 2,6-hexahydrotoluene diisocyanate ($H_6$TDI),
hexahydro-1,3 and/or 1,4-phenylene diisocyanate,
perhydro 2,4' and/or 4,4'-diphenylmethane diisocyanate ($H_{12}$MDI), and in general aromatic amino precursors or perhydrogenated carbamates,
bis-isocyanatomethylcyclohexanes (in particular 1,3 and 1,4) (BIC),
bis-isocyanatomethylnorbornanes (NBDI),
2-methylpentamethylene diisocyanate (MPDI),
tetramethylxylylene diisocyanates (TMXDI),
lysine diisocyanate as well as di-ou triisocyanate lysine esters (LDI ou LTI),
2,4- and/or 2,6-toluene diisocyanate,
diphenylmethane-2,4' and/or 4,4'-diisocyanate (MDI),
1,3- and/or 1,4-phenylene diisocyanate,
triphenylmethane-4,4',4"-triisocyanate, and
oligomers of MDI or of TDI.

The products of homocondensation are the products derived from the condensation of one of the isocyanate monomers listed above with itself. The products of heterocondensation are the products derived from the condensation of two or more of the monomers listed above, either together and/or optionally with one or more mobile hydrogen compounds, such as an alcohol, a diol and other similar compounds.

The polyisocyanates contained in the composition of the present invention may also be polyisocyanate derivatives resulting from aromatic isocyanates used alone or mixed with aliphatic compounds.

However, the use of these aromatic derivatives is limited in terms of the amount and is also not a preferred variant, since this generally results in coatings which may undergo discolouration, generally yellowing, as they age, particularly if the coatings are exposed to a high degree of ultraviolet radiation, for example solar ultraviolet radiation.

Examples of non-limiting aromatic isocyanates include:
2,4- and/or 2,6-toluene diisocyanate,
diphenylmethane-2,4' and/or 4,4'-diisocyanate (MDI),
1,3- and/or 1,4-phenylene diisocyanate,
triphenylmethane-4,4',4"-triisocyanate, and
MDI or TDI oligomers.

Mixtures of these (cyclo)aliphatic and/or aromatic polyisocyanates may also be used.

The viscosity of the non-masked polyisocyanate compounds used in the invention lies in a wide viscosity range determined by the structure of the polyisocyanate compounds which may be used. The viscosity is generally greater than 10 mPa·s at 25° C. with a non-volatile matter content of 100%, preferably greater than 100 mPa·s at 25° C. with a non-volatile matter content of 100%.

The viscosity of Rhodia products is given by way of example, such as Tolonate® HDT-LV2 which has a viscosity of approximately 600 mPa·s±150 mPa·s at 25° C., or Tolonate® HDT with a viscosity of 2,400 mPa·s±400 mPa·s at 25° C., or Tolonate® HDB with a viscosity of 9,000 mPa·s±2,000 mPa·s at 25° C., or Tolonate® HDT HR with a viscosity of approximately 20,000 mPa·s at 25° C. with a non-volatile matter content of 100%, or 2,000 mPa·s at 25° C. with a non-volatile matter content of 90% in n-butyl acetate.

Some polyisocyanate compounds are solid at a non-volatile matter content of 100%. For example, this is the case for the IPDI isocyanurate trimer or IPDI dimer. The viscosities of some of these compounds in an organic solution are given by way of example; Tolonate® IDT 70 S (IPDI isocyanurate trimer) thus has a viscosity of approximately 1,700 mPa·s±600 mPa·s at 25° C. for a formulation of 70% non-volatile matter in Solvesso® 100, Tolonate® IDT 70 B (IPDI isocyanurate trimer) has a viscosity of approximately 600 mPa·s±300 mPa·s at 25° C. for a formulation of 70% non-volatile matter in n-butyl acetate.

Homocondensation and/or heterocondensation products originating from an aliphatic, in particular non-cyclic, diisocyanate monomer, preferably HDI, are preferred due to the ability thereof to impart greater resistance to chipping to coatings.

The present invention also relates to a composition as defined above, in which the (poly)isocyanate is an (poly) isocyanate having an average functionality of isocyanate functions at least equal to 2 and at most equal to 20, preferably between 2.2 and 10, advantageously between 3 and 6.

It has been observed that when the average functionality of isocyanate functions of the (poly)isocyanate increases, i.e. the resistance to chipping and the hardness of the coating are improved, this phenomenon is particularly marked when it comes to retouching.

Within the scope of the present invention, the average functionality of isocyanate functions f(iNCO) is defined by the following formula:

$$f(iNCO) = \frac{Mn \times [iNCO]}{42 \times 100}$$

where: Mn represents the average molecular weight in numbers obtained by gel permeation and
[iNCO] represents the concentration of isocyanate functions in grams per 100 grams.

The (poly)isocyanates present in the composition according to the invention may be present in masked form, that is to say that the isocyanate functions are not free but are masked by a masking agent or a mixture of masking agents, such as those defined below. In particular, the use of masked (poly) isocyanate compositions is preferred in order to prepare a mono-component coating formulation type (formulation 1K).

"Masked (poly)isocyanate" is to be understood in the present description as a (poly)isocyanate for which at least 50%, preferably 80%, advantageously 90%, and more preferably all of the isocyanate functions, are masked.

The masking agent or the mixture of masking agents which temporarily or permanently protects the isocyanate functions are compounds which have at least one function carrying a labile hydrogen, generally a function carrying a labile hydrogen, preferably a single function carrying a labile hydrogen and are reactive in relation to the isocyanate function. This function which carries a labile hydrogen may have a pKa value corresponding either to the ionisation of an acid [including the hydrogen of -ol functions ("-ol(s)" is to be understood in the present description as phenols and alcohols)], or to the associated acid of a base (generally nitrogenated).

More specifically, in order to optimise the results of the present invention, said pKa (or one of them if a plurality thereof can be determined) of the function carrying one or more labile hydrogens is at least 4, advantageously 5, preferably 6 and at most 14, advantageously 13, preferably 12 and more preferably 10. An exception thereto must be made for lactames, the pKa of which is greater than these values and which represent potential masking agents, although they are not preferred for the invention.

A masking agent is known as a temporary masking agent when the isocyanate function is protected temporarily by the masking agent and does not react under storage conditions for the formulated system with hydroxyl functions of the mobile hydrogen compound, in particular with polyol, but is subsequently freed during the thermal cross-linking reaction in a furnace.

The freed isocyanate function therefore reacts with the mobile hydrogen functions or the polyol reagent in order to produce a urethane bond and to form a polyurethane network which forms a portion of the coating. The temporary masking agent is either eliminated as a volatile organic compound along with most of the solvents in the formulation, or remains in the film, or reacts with the aminoplastic resin when the formulation contains said aminoplastic resin.

Non-limiting examples of temporary masking agents according to the invention are hydroxylamine derivatives, such as hydroxysuccinimide and oximes, such as methylethylketokime, hydrozine derivatives such as pyrazoles, triazole derivatives, imidazole derivatives, phenol derivatives or the like, amide derivatives such as imides and lactames, hindered amines such as N-isopropyl-N-benzylamine, as well as malonates or ketoesters and hydroxamates. These compounds may also comprise substituents, in particular alkyl chains.

In order to determine the pK$_a$ values defined above, reference could be made to "The determination of ionization constants, a laboratory manual", A. Albert of E. P. Serjeant; Chapman and Hall Ltd, London".

For the list of masking agents, reference could be made to Z. Wicks (Prog. Org. Chem., 1975, 3, 73 et Prog. Org. Chem., 1989, 9,7) and Petersen (Justus Liebigs, Annalen der Chemie 562, 205, (1949).

Methylethylketoxime also known as MEKO, 3,5-dimethylpyrazole, also known as DMP, 2 or 4 alkylimidazoles, dialkyl malonates, cyclic β-keto-esters, amines, hindered amines and caprolactame are preferred as temporary masking agents.

The present invention is not limited only to temporary masking agents but masking agents said to be permanent may also be used. These are characterised by the fact that the isocyanate functions are protected by the masking agent and do not react with the hydroxyl functions of the mobile hydrogen compound, in particular the polyol, under storage conditions of the formulated system nor during the thermal cross-linking reaction in a furnace.

The isocyanate functions are thus not restored at the time of the cross-linking reaction effected by curing in a furnace and remain masked, said masked functions thus being able to react in the cross-linking conditions in a furnace with the methylol (—N—CH$_2$—OH) or alkoxyalkyl (—N—CH$_2$—O-alkyl) functions of the aminoplastic resins (melamine, benzoguanamine . . . ), in the presence of an acidic, preferably sulphonic catalyst or a latent precursor of said catalyst which may be a tertiary amine salt or a sulphonic acid salt.

In some cases, the surfactant present in the coating composition according to the invention may play the role of a catalyst, in particular when the surfactant is of the anionic type and comprises a phosphorus atom.

The masking agents used in order to permanently protect the isocyanate function are generally compounds having hydroxyl or sulphydryl functions, preferably monofunctional functions, such as hydroxyl(cyclo)alkanes, for example methanol, butanols, cyclohexanol, 2-ethylhexanol or compounds having carboxylic acid functions, such as propionic acid, pivalic acid and benzanoic acid. These compounds may optionally carry one or more substituents.

These masking agents which are said to be "permanent" may also be isocyanate functions masked by compounds comprising at least one cross-linkable function able to polymerise via UV radiation. Examples of "permanent" masking agents are hydroxyalkyl acrylates or hydroxyalkyl methacrylates.

In certain cases temporary bi- or poly-functional masking agents comprising functions able to yield temporarily and/or permanently masked isocyanate functions may also be used, generally in limited amounts. However, this is not preferred since the masked polyisocyanate compounds quickly exhibit high viscosities, and this effect is all the more masked the further functionality of isocyanate functions (NCO) increases.

The composition according to the invention may advantageously also contain a solvent, the amount of solvent relative to the amount of mixture formed by the surfactant system and the (poly)isocyanate being less than 50% by weight, preferably less than 40%, the solvent being selected from the group consisting of esters, ethers, acetals, cyclic or linear carbonates, lactones, glycol or propylene glycol ethers and N-alkyl amides.

The solvent is used in this embodiment in order to lower the viscosity of the starting polyisocyanates.

This content of solvent is necessary, in particular in order to use compounds such as IPDT which are solid at ambient temperature and used in the form of formulations.

The content of solvent is minimised in order to avoid compositions which are too rich in VOC (volatile organic compounds).

The present invention also relates to a composition which is cross-linkable by thermal treatment, as defined above, and further comprises at least one compound carrying at least one mobile hydrogen function selected from the primary or secondary hydroxyl functions, phenol functions, primary and/or secondary carboxylic functions, amine functions and SH functions and, optionally, at least one organic solvent.

The composition as defined above preferably comprises:
from 10 to 60% by weight (poly)isocyanate, relative to the total weight of the composition without solvent (% dry weight);
from 0.25 to 12% by weight surfactant, relative to the total weight of the composition without solvent (% dry weight);
from 30 to 80% by weight compound, carrying at least one mobile hydrogen function, relative to the total weight of the composition without solvent (% dry weight); and
from 0 to 30% by weight organic solvent, relative to the total weight of the composition.

The composition as defined above may advantageously also comprise at least one aminoplastic resin ("aminoplast" resin) of the melamine-aldehyde type, in particular melamine-formaldehyde, and/or urea-aldehyde, in particular urea formaldehyde, or benzoguanamine and/or the alkoxyalkyl derivatives thereof.

According to a preferred embodiment, the amount of aminoplastic resin(s) in the composition as defined above is between 15 and 25% by weight, relative to the total weight of the composition without solvent (% dry weight).

The composition according to the present invention also comprises an aminoplastic or aminoplast-type resin of the melamine-formaldehyde and/or urea formaldehyde and/or benzoguanamine-formaldehyde type. These polymers are known and details relating to the synthesis thereof are given in the works cited above, in particular in the book by Stoye and Freitag on page 102, chapter 6.2.

These aminoplastic resins react, in particular, at a temperature between 100 and 180° C. with the urethane functions of the polyurethane network previously created or formed during the cross-linking reaction in a furnace due to the freed isocyanate functions reacting with the hydroxyl functions of the polyol or with the true carbamate functions (R—O—C(=O)—$NH_2$) optionally carried by the polyols or the polyisocyanates.

The cross-linking reaction of these melamines with the urethane functions or true carbamate functions (R—O—C(=O)—$NH_2$) is a known reaction which is generally catalysed by a strong acid, such as para-toluenesulphonic acid or naphthalene-sulphonic acid, or even a latent form of said acid catalysts, i.e. the tertiary amine salts of said strong acids. Reference could be made to the books cited above in order to obtain more detailed information regarding these aminoplastic resins and the synthesis thereof.

The presence of one or more aminoplastic resins in the coating composition according to the present invention is particularly advantageous for the formation of the base coat and is not generally necessary for the formation of the top coat, although this is not excluded from the scope of the invention.

The present invention also relates to a composition as defined above, in which the compound carrying at least one mobile hydrogen function is a polymer containing at least two hydroxyl (alcohol or phenol) functions and/or thiol functions and/or primary or secondary amine functions and/or containing carboxylic acid functions and/or containing precursor functions of the epoxy or carbonate type which, by reacting with a suitable nucleophile, free the hydroxyl functions.

The compounds are preferably selected from polyols which may be used alone or in a mixture.

Examples of compounds of this type are dispersed polyols or polyurethanes or polyamines or polythiols or polyacids or even polycaprolactones-based polymers. These polymers may optionally contain a plurality of mobile hydrogen functions. Mixtures of polymers of this type may also be used. Generally, polyols selected from polyesters, polyacrylates, polycaprolactones or polyethers or mixtures thereof are preferred.

Polyesters or acrylic polyols or carbonate polyols or polyurethane polyols will advantageously be contained in coatings exposed to outside conditions.

Polyol compositions classed as latex may also be used. These compounds are generally obtained by radical polymerisation of compounds containing alkenyl functions, such as acrylates, methacrylates, styrenyls, etc.

Even more preferably, the composition as defined above is characterised in that the compound carrying at least one mobile hydrogen function is a polyol selected from acrylic or polyester or polyurethane polymers.

In order to enhance the flexibility of coatings and, in particular, for the "primer" coat, it is preferred to use polyester polyols or urethane polyesters. Generally, a mixture of two polyester or urethane polyester resins is used, one resin being characterised by a "hard" nature and the other by a "soft" or "resilient" nature. The hard or soft nature of the polyesters is conferred by the nature of the monomers during synthesis of said polyesters.

A "hard" polyester is thus obtained by selecting aromatic and/or cycloaliphatic and/or highly branched acid or alcohol monomers. Examples of monomers of this type are phthalic anhydride or cyclohexanediol or 2,2,4-trimethylpentanediol.

A "soft" polyester is obtained by selecting slightly branched linear aliphatic monomers such as adipic acid or 1,4-butanediol or 1,6-hexanediol, or monomers which even comprise heteroatoms in their structure, such as di- or polyethyleneglycols. However, the latter are not desirable insofar as these compounds exhibit a weakness with regard to their stability to ultraviolet rays.

Polyester polyols are industrial products and their synthesis is largely described and known to the person skilled in the art. For more details, reference may be made to the following works: "Matériaux polymères, structure, propriétés et applications" by Gottfried W. Ehrenstein and Fabienne Montagne published in 2000 by Hermès Science; "Handbook of Polyurethanes" by Michael Szycher, published in 1999 by CRC press; "Resins for coatings, Chemistry, Properties and Applications" by D. Stoye and W. Freitag, published by Hanser in 1996, as well as the aforementioned Eurocoat 97 article. The commercial catalogues of companies which supply polyols, in particular the book entitled "Specialty Resins, creating the solution together" of AKZO NOBEL RESINS published in February 2001 may also be consulted.

The polyol as defined above advantageously has a functionality of mobile hydrogen groups at least equal to 2, generally from 2 to 100, preferably from 2 to 30.

According to another advantageous embodiment, the polyol has an OH functionality from 2 to 30, preferably from 2 to 10.

Generally, for the intended application, an OH functionality which is too high will lead to compounds which are too "hard". It is therefore preferred to use polyester polyols which have a relatively low functionality which is lower than 15, preferably lower than 10.

The definition of the average functionality of hydroxyl functions per polymer chain, is, for example, given in the article by Ben Van Leeuwen entitled "High solids hydroxy acrylics and tightly controlled molecular weight" which appeared in the conference series of Eurocoat 1997 (pp 505-515) on page 507.

This average functionality F(OH) is calculated using the following equation:

$$F(OH) = \frac{OH \text{ number} \times Mn}{56100}$$

in which:
F(OH) represents the average functionality of hydroxyl functions;
OH number represents the titre of hydroxyl functions expressed in mg of KOH (potassium hydroxide) per gramme of polymer; and
Mn represents the average molecular weight in numbers of the polymer, determined by gel permeation chromatography (GPC) by comparison with polystyrene calibration standards.

The present invention also relates to a composition as defined above, characterised in that the average molecular weight in numbers of the compound carrying at least one mobile hydrogen function is from 100 to 100,000.

According to a preferred embodiment, the composition as defined above comprises a polyol which is a polyester polyol with an average molecular weight in numbers from 500 to 10,000, preferably from 600 to 4,000.

In certain cases, a polyol or a mixture of polyacrylic polyols which afford the coating increased hardness may also be used. These polyols may be "hard" or "soft" depending on whether monomers having an aromatic and/or cycloaliphatic and/or heavily branched nature for this "hard" property and monomers having a primarily aliphatic nature for the "soft" property are used respectively.

The synthesis of acrylic polyols is also known to the person skilled in the art and reference may be made to the aforementioned books for more details regarding their synthesis.

The average molecular weight in numbers for acrylic polyols is generally between 134 and 50,000, preferably 500 and 25,000, advantageously between 1,000 and 15,000.

The titre of hydroxyl functions is generally between 10 and 750 mg of KOH per gram of polymer, preferably between 15 and 500 mg of KOH per gram of polymer.

For examples of acrylic polyols, reference may be made to page 515 of the aforementioned Eurocoat 97 article where the characteristics of some acrylic polyols are given, these examples being of a non-limiting nature.

Hyperbranched polyols which are generally characterised by a greater functionality than linear polyols may also be used, but these products are not preferred due to the high viscosity thereof.

Structured or block polyols may also be used if it is desired to compartmentalise the properties. However, these products, which are generally more expensive, are only used to produce a specific property. These compounds, are, for example, a rheological agent or an agent which assists in the dispersion of pigments.

Generally, for the requirements of the present invention, the ratio of isocyanate functions/mobile hydrogen functions is between 1.5 and 0.5, preferably between 1.2 and 0.8. In particular, when the mobile hydrogen compound is a polyol, the isocyanate functions/hydroxyl functions ratio is between 1.5 and 0.5, preferably between 1.2 and 0.8.

The present invention also relates to a process for preparing a hydrophilic polyisocyanate composition as defined above, comprising a step of mixing the compounds of formulae (I) and (II), the amine and the (poly)isocyanate.

When the amine is primary or secondary, it is preferable to avoid it being present alone with the isocyanate since it can react and produce urea.

When using a secondary or primary amine, it is preferable to proceed to the neutralisation step before adding it to the polyisocyanate in order to avoid undesired reactions between NCO groups and the amine. If a tertiary amine is used, it is optionally possible to mix the amine with the polyisocyanate and then carry out the neutralisation step by adding the acid part.

The present invention also relates to a process for preparing a composition as defined above, in which the amine of the surfactant is a primary or secondary amine, said process being characterised in that it comprises a step of mixing the compounds of formulae (I) and (II) and the amine followed by a step in which the (poly)isocyanate is added.

The present invention also relates to a process for preparing a composition as defined above, in which the amine of the surfactant is a tertiary amine, said process being characterised in that it comprises a step of mixing the compounds of formulae (I) and (II) and the amine, followed by a step in which the (poly)isocyanate is added, or in that it comprises a step of mixing the amine and the (poly)isocyanate, followed by a step in which the compounds of formulae (I) and (II) are added.

The preparation process of the present invention is carried at a temperature preferably 5 100° C., advantageously at a temperature from 15 to 60° C., and even more preferably from 20 to 50° C., preferably working in an inert atmosphere and avoiding the introduction of water. This is generally preferable to work at ambient temperature but for specific reasons relating to viscous polyisocyanate formulations, it is possible to work at temperatures greater than ambient temperature.

The present invention also relates to a process for producing a coated substrate, characterised in that it comprises a step of applying to a substrate a composition which is cross-linkable by thermal treatment as defined above, and a step of cross-linking by thermal treatment of said composition.

According to an advantageous embodiment, the process as defined above is characterised in that the cross-linking by thermal treatment is carried out at a temperature from 60° C. to 300° C., preferably greater than 80° C. and lower than 300° C., advantageously from 100° C. to 200° C., for a period of time lasting from a few seconds to a few hours.

The aforementioned cross-linkable composition may be used as a first coat (preparation of a coating for original equipment) or as a secondary coat, in particular as a hardener of the first layer of a coating or for retouching.

The present invention also relates to a coated substrate obtainable from the process as defined above.

The substrate may be of any type and is generally a metal substrate, for example aluminium or steel, in particular stainless steel. The substrate may also be a substrate made of plastics material, i.e. a thermoplastic or thermosetting polymer material, optionally comprising fillers, for example reinforcement fillers such as fibreglass, carbon fibre and the like.

Due to the properties conferred by the aforementioned coating, the coated substrate may optionally be folded, moulded or pressed. The substrate thus coated has excellent resistance to chipping as well as an excellent resistance to pressure washes, even high-pressure washes, in particular in the case of plastics materials substrates.

Other additive compounds may be added to the coating formulations, in particular to facilitate implementation or to protect or embellish. In this context, anti-foaming agents, pigments or colouring agents or additives conferring resistance to scratches or graffiti may be mentioned. This type of addition is well-known to the person skilled in the art or to the formulator of the coating who will adjust the amounts to the properties required for the application.

The fields of application of the new compounds are adhesives, paints and varnishes, glues, products for treating textiles or mineral, organic or organic mineral fibres, concrete or walls. The supports to be coated in this case are wood, metals, textiles, various celluloses, mineral compounds and glasses.

Measuring the Acid Value

The method for measuring the acid value consists of neutralising the product after it has been dissolved in a suitable solvent [water or water plus 2.5% Igepal NP-10 (or nonylphenol 10 OE) or water/ethanol at a ratio of 50/50] using a solution of potassium or sodium hydroxide. pH-metric or potentiometric titration is used.

The procedure of this assay method is as follows:
1) Preparation of 2 100 mL Solutions:

Approximately 2 g of the product to be tested are weighed in a 250 ml beaker and are made up to approximately 100 ml with a solution of deionised water and, if necessary, for better dissolution, 2.5% Igepal NP-10 is added. Lastly, the mixture is stirred until total dissolution is achieved (magnetic stirring).

2) First Assay: Assaying the Two First Acidities

One of the phosphate ester solutions (prepared in the preceding step) is titrated with 0.5 N sodium hydroxide with vigorous stirring (magnetic stirring). Two inflections corresponding to the first acidity of $H_3PO_4$, of the diester and the monoester and secondly to the second acidity of $H_3PO_4$ and the second acidity of the monoester respectively are obtained.

The volume of the titrant required in order to obtain each jump is noted:
$V_1$ for the first equivalence.
$V_2$ for the second equivalence.

3) Second Assay: Assaying of the Third Acidity

The second phosphate ester solution is titrated in the same manner as the previous solution but, just before the second inflection, 10 ml of a 10% $CaCl_2$ solution is quickly added using a syringe which causes a decrease in pH:

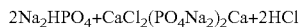

$$2Na_2HPO_4 + CaCl_2(PO_4Na_2)_2Ca + 2HCl$$

followed by the third inflection corresponding to the third acidity of $H_3PO_4$. The volume, $V_3$, of titrant required to obtain the third jump is noted.

The acid values are thus calculated as follows:

First Acid Value:

$$I_{A1} = \frac{V_1 \times N \times 56,1}{m_1}$$

Second Acid Value:

$$I_{A2} = \frac{V_2 \times N \times 56,1}{m_1}$$

Third Acid Value:

$$I_{A3} = \frac{V_3 \times N \times 56,1}{m_2}$$

in which
$V_i$=volume of sodium hydroxide solution in ml
N=normality of the titrant
$m_i$=weight in g of phosphate ester titrated in solution i
Molar mass of KOH=56.1 g The molar percentages of $H_3PO_4$, of monoester and diester in the ionic phase are calculated as follows:

$$\% \ H_3PO_4 = \frac{V_3 - V_2}{V_1} \times 100 = \frac{I_{A3} - I_{A2}}{I_{A1}} \times 100$$

$$\% \ \text{monoester} = \frac{(2V_2 - V_1 - V_3)}{V_1} \times 100 = \frac{(2I_{A2} - I_{A1} - I_{A3})}{I_{A1}} \times 100$$

$$\% \ \text{diester} = \frac{(2V_1 - V_2)}{V_1} \times 100 = \frac{(2I_{A1} - I_{A2})}{I_{A1}} \times 100$$

The percentage by weight of $H_3PO_4$, free monoester and free diester are calculated as described below.

In order to calculate the average molar mass, the mole fractions are used: $n(H_3PO_4)$, n(monoester), n(diester) and n(ionic), in which:
$n(H_3PO_4)$=% $H_3PO_4$/100
n(monoester)=% monoester/100
n(diester)=% diester/100
n(ionic)=% ionic/100

The average molar mass ($MM_{av}$) is thus calculated as follows:

$$MM_{av} = (M(H_3PO_4) \times n(H_3PO_4)) + (M(\text{monoester}) \times n(\text{monoester})) + (M(\text{diester}) \times n(\text{diester}))$$

The percent by weight are thus as follows:

$$\% \text{ ionic} = \frac{V_1 \times N \times MM_{av}}{10 \times m_1}$$

$$\% \text{ H}_3\text{PO}_4 = \frac{M(\text{H}_3\text{PO}_4)}{MM_{av}} \times n(\text{H}_3\text{PO}_4) \times n(\text{ionic}) \times 100$$

$$\% \text{ monoester} = \frac{M(\text{monoester})}{MM_{av}} \times n(\text{monoester}) \times n(\text{ionic}) \times 100$$

$$\% \text{ diester} = \frac{M(\text{diester})}{MM_{av}} \times n(\text{diester}) \times n(\text{ionic}) \times 100$$

EXAMPLES

The following products were used:
bis(2-ethylhexyl) phosphate (B2EHP), CAS no. [298-07-7], 97% Aldrich diester

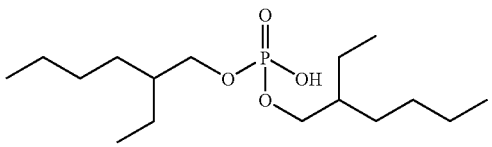

compound of formula (I) in which $R_1=R_2=$2-ethylhexyl
dibutylphosphate (PHD) CAS no. [107-66-4] 97% diester, Aldrich

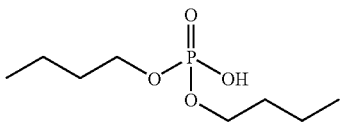

compound of formula (I) in which $R_1=R_2=$butyl
HORDAPHOS MOB, CAS no. [12788-93-1], CLAIRANT phosphoric acid ester, mono/diester molar ratio=7.4
HORDAPHOS MDB, CAS no. [12788-93-1], CLAIRANT phosphoric acid ester, mono/diester molar ratio=1.6
Rhodafac SS 610 CAS no. [9046-01-9] RHODIA phosphoric acid ethoxyl ester, mono/diester molar ratio=5.8

| mg KOH/g | Hordaphos MOB | Hordaphos MDB | Rhodafac SS 610 |
|---|---|---|---|
| First acidity | 360 | 312 | 103 |

DMCHA: N,N-dimethylcyclohexylamine, CAS no. [98-94-2], BASF

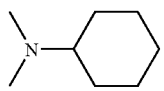

NEM; N-ethylmorpholine, CAS no. [100-74-3] BASF

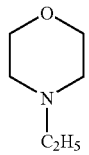

EDIPA ethyldiisopropylamine CAS no. [7087-68-5] BASF

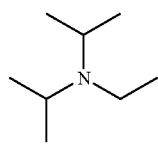

Tolonate HDT (Rhodia): Hexamethylene diisocyanate (HDI)-based polyisocyanate which is characterised substantially by the presence of isocyanurate cyclic structures and characterised to a lesser extent by biuret functions and dimer cyclic structures (diazetidine dione); its isocyanate function content is approximately 22%±0.5% by weight and its viscosity is between 2,000 and 2,800 mPas at 25° C.
Tolonate HDT LV2 (Rhodia): Hexamethylene diisocyanate (HDI)-based polyisocyanate which is characterised substantially by the presence of isocyanurate cyclic structures and characterised to a lesser extent by biuret functions and dimer cyclic structures (diazetidine dione); its isocyanate function content is approximately 23%±1% by weight and its viscosity is between 450 et 750 mPas at 25° C.
SETALUX 6511 AQ-47 (Nuplex): acrylic polyol, OH %=4.2%, ES=47%,
SETALUX 6520 AQ-45 (Nuplex): acrylic polyol, OH %=3.2%, ES=45%,
Macrynal 6299 WA 42 (Cytec) acrylic polyol (Cytec), OH %=4.1%, ES=42%

Preparation of Surfactants and Hydrophilic Polyisocyanates for Use with Polyurethane Dispersions Phosphate esters were neutralised with amines by means of simple mixing for 1 hour in a roller pot. The surfactants prepared previously were mixed in a roller pot for one night with tolonate HDT or tolonate HDT LV2 in order to prepare the hydrophilic polyisocyanates.

The table below summarises the compositions of the various hydrophilic polyisocyanates (the term 'phosphate 1' refers to unethoxylated phosphate esters):

| | | | | Composition by weight (%) | | | | |
|---|---|---|---|---|---|---|---|---|
| | Phosphate 1 type | HDT | HDT LV2 | DMCHA | NEM | EDIPA | Phosphate 1 | SS 610 |
| Example 1 | MOB | 88 | / | 5.6 | / | / | 6.4 | / |
| Example 2 | B2EHP | 88 | / | 3.4 | / | / | 8.6 | / |

-continued

| | Phosphate 1 type | HDT | HDT LV2 | DMCHA | NEM | EDIPA | Phosphate 1 | SS 610 |
|---|---|---|---|---|---|---|---|---|
| | | | | Composition by weight (%) | | | | |
| Example 3 | MDB | 88 | / | 6.2 | / | / | 5.8 | / |
| Example 4 | DBP | 88 | / | 4.6 | / | / | 7.4 | / |
| Example 5 | DBP | 93 | / | 2.05 | / | / | 2.15 | 2.8 |
| Example 6 | DBP | 93 | / | 1.65 | / | / | 0.9 | 4.45 |
| Example 7 | DBP | 90 | / | 2.95 | / | / | 3.05 | 4 |
| Example 8 | DBP | 90 | / | 2.4 | / | / | 1.2 | 6.4 |
| Example 9 | DBP | 93 | / | 2.45 | / | / | 3.45 | 1.1 |
| Example 10 | DBP | 90 | / | 3.5 | / | / | 4.9 | 1.6 |
| Example 11 | MDB | 92 | / | 3.5 | / | / | 4.5 | / |
| Example 12 | MDB | 92 | / | / | 3.3 | / | 4.7 | / |
| Example 13 | MDB | 92 | / | / | / | 3.5 | 4.5 | / |
| Example 14 | MDB | / | 92 | 2.6 | / | / | 2.4 | 3.2 |
| Example 15 | MDB | / | 92 | / | 2.5 | / | 2.3 | 3.2 |
| Example 16 | MDB | / | 92 | / | / | 2.6 | 2.3 | 3.1 |
| Example 17 | MDB | 92 | / | 2.6 | / | / | 2.4 | 3.2 |
| Example 18 | MDB | 92 | / | / | 2.5 | / | 2.3 | 3.2 |
| Example 19 | MDB | 92 | / | / | / | 2.6 | 2.3 | 3.1 |

Application Results

1) Evaluation of Dispersibility in Water

Particle size was measured using a Mastersizer 2000 laser-type granulometer from Malvern. The average particle size corresponding to 50% and 90% of the population by volume is given.

| Product example No. | Monoester/diester molar ratio | $d_{50}$ (μm) | $d_{90}$ (μm) |
|---|---|---|---|
| 5 | 0.4 | 15.5 | 23.9 |
| 6 | 1.2 | 0.1 | 0.4 |
| 7 | 0.4 | 9.8 | 16.8 |
| 8 | 1.2 | 0.1 | 0.1 |
| 9 | 0.1 | 58.3 | 92.8 |
| 10 | 0.1 | 24.7 | 39.3 |
| 18 | 2.1 | 0.097 | 0.097 |
| 19 | 2.1 | 0.114 | 0.114 |

The products with monoester/diester ratios lower than 1 have particle sizes greater than a micron and are not easily self-emulsifiable.

2) Preparation of a Polyurethane Dispersion-Based Formula for Floor Varnish

The polyisocyanates of examples 1 to 4 were diluted with 30% butyl glycol acetate in order to be ready for use. A formulation consisting of 10 parts of a commercial part A from BONA (ref Flow) and of 1 part polyisocyanates diluted in the butyl glycol acetate was then produced. The mixture was hand-made in a 50 ml beaker. After 10 mins of rest the compositions were applied to Leneta plates and left at a regulated temperature and humidity (23° C., 50% RH) for 7 days. Shine at 60° was then measured using a glossmeter (BYK) and the visual appearance of the film was assessed using a scale of 1 to 10.

1: film having no defects

10: completely heterogeneous film having traces of gels or dewetting.

The following table shows the results obtained:

| Example | Quality of the mixture | Film score | Product of the example |
|---|---|---|---|
| Example 20 | RAS | 2 | 1 |
| Example 21 | heterogeneous | 10 | 2 |
| Example 22 | RAS | 3 | 3 |
| Example 23 | curd | 8 | 4 |

Examples 21 and 23, prepared based on pure diesters, have a very poor visual appearance.

For the examples prepared from mixtures of mono and diesters, it is possible to obtain films which have a satisfactory visual appearance (examples 20 and 22).

The hydrophilic polyisocyanate of Example 1 was again used in the same conditions but a different solvent was used to dilute the polyisocyanate.

The table below shows the results with regard to shine and film appearance.

| Example | Mixture | 60° | Film score | Solvent |
|---|---|---|---|---|
| Example 24 | RAS | 84 | 2 | butyl glycol acetate |
| Example 25 | RAS | 87 | 3 | ProGlyde DMM (Dow) |
| Example 26 | RAS | 85 | 3 | Rhodiasolv RPDE (Rhodia) |

The results are comparable for the three solvents and indicate that the formulation is robust to changes in the nature of the solvents.

3) Preparation of an Acrylic Polyol-Based Formula for Metal Application:

The polyol used was an acrylic-type polyol (Macrynal 6299 from Cytec) titrant 4.1% OH. Part A was prepared by mixing the following ingredients in order:

| | Amount (g) | Function | Supplier |
|---|---|---|---|
| Macrynal VSM 6299W/42WA | 83.75 | polyol | Cytec |
| Borchi gel LW44 (50% in H2O) | 0.5 | thickener | Borchers |

-continued

| | Amount (g) | Function | Supplier |
|---|---|---|---|
| Butoxyl | 4.8 | solvent | Celanese |
| Proglyde DMM | 0.95 | solvent | Dow |
| BYK346 | 0.95 | wetting agent | Byk |
| Borch GOL LAC 80 (10% in butoxyl) | 1.45 | levelling agent | Borcher |
| H₂O | 7.6 | | |

The end formulation was produced by mixing part A with the polyisocyanates of Examples 1 and 3 in accordance with the following conditions:

| | Example 27 | Example 28 |
|---|---|---|
| Part A (g) | 80.02 | 80.22 |
| Polyisocyanate of Example 1 | 30.84 | / |
| Polyisocyanate of Example 3 | / | 30.62 |
| Butoxyl (g) | 7.75 | 7.74 |
| Water added (g) | 31.13 | 30.71 |
| Viscosity cup DIN 4 | 25"17 | 23"59 |

The formulations were then applied using a film applicator to a glass plate and shine was measured after 7 days of storage in a controlled atmosphere (23° C. et 50% relative humidity).

| Test | Example 27 | Example 28 |
|---|---|---|
| Thickness | 61 μm | 64 μm |
| Shine at 20° | 89 | 84 |
| Haze | 26 | 65 |

The use of the products which are the subject of the invention in this formula makes it possible to obtain coatings which are of high visual quality with low haze values. This indicates improved compatibility.

4) Preparation of an Acrylic Varnish Formula for Plastics Material Application

Firstly, a mixture of additives was prepared in accordance with the following composition: (Dispermat at 2000 rpm)

| Product | % by weight | Function | Producer |
|---|---|---|---|
| Butyl glycol | 44 | Co-solvent | |
| Dehydran 1293 | 20.6 | Anti-foaming agent | Cognis |
| BYK 301 | 13.1 | Slip agent | BYK Chemie |
| BYK 348 | 22.3 | Wetting agent | BYK Chemie |

Preparation of Part a on Dispermat at 2000 rpm

Each ingredient according to the following composition was added progressively. Next, all of the ingredients were stirred at 3000 rpm for 20 min.

| Product | Weight (g) | Nature | Producer |
|---|---|---|---|
| Setalux 6511 AQ47 | 509 | Acrylic polyol | Nuplex |
| Setalux 6520 AQ45 | 176 | Acrylic polyol | Nuplex |
| H₂O (demineralised) | 80 | | |
| DMEA (dimethyl ethanol amine) | 3.8 | Neutralisation agent | |
| Additive mixture | 24.2 | | |
| BGA (butyl glycol acetate) | 70 | Co-solvent | |
| H₂O (demineralised) | 137 | | |

The amount of polyisocyanate necessary to achieve a NCO/OH ratio of 1.4 and, optionally, a solvent for diluting the polyisocyanate were added in a 250 ml beaker to "part A".

| Example ref. | Product of the example | Part A (g) | Part B (g) | Butoxyl (g) |
|---|---|---|---|---|
| 29 | 5 | 100 | 21.3 | / |
| 30 | 6 | 100 | 21.3 | / |
| 31 | 7 | 100 | 21.8 | / |
| 32 | 8 | 100 | 21.8 | / |
| 33 | 9 | 100 | 21.3 | / |
| 34 | 10 | 100 | 21.8 | / |
| 35 | 11 | 100 | 21.4 | 5.4 |
| 36 | 12 | 100 | 21.4 | 5.4 |
| 37 | 13 | 100 | 21.4 | 5.4 |
| 38 | 14 | 100 | 20.4 | 5.1 |
| 39 | 15 | 100 | 20.4 | 5.1 |
| 40 | 16 | 100 | 20.4 | 5.1 |
| 41 | 17 | 100 | 21.4 | / |
| 42 | 18 | 100 | 21.4 | / |
| 43 | 19 | 100 | 21.4 | / |

12 g demineralised water were added after application in order to reduce viscosity.

All of the ingredients were mixed for 60 seconds using a viscometer (model 33271 ERICHSEN).

After 10 min of rest, the mixture was applied using an ERICHSEN automatic film applicator (model 509/3) at a speed of 18 mm/s to two glass plates for a wet thickness of 200 μm.

The plates were desolventised for 15 min at ambient temperature then cured in a furnace for 30 min at 80° C.

After curing, the plates were kept in a conditioned atmosphere (23° C., 50% humidity). Shine at 20° was then measured using a glossmeter (BYK). The shine and haze values (indicating the visual quality of the film) are shown in the following table:

| Example ref. | Product example no. | Monoester/diester Molar ratio | gloss 20° | haze |
|---|---|---|---|---|
| 27 | 5 | 0.4 | 67 | 305 |
| 28 | 6 | 1.2 | 94 | 29 |
| 29 | 7 | 0.4 | 65 | 346 |
| 30 | 8 | 1.2 | 93 | 57 |
| 31 | 9 | 0.1 | 56 | 352 |
| 32 | 10 | 0.1 | 64 | 324 |
| 33 | 11 | 1.6 | 92 | 90 |
| 34 | 12 | 1.6 | 89 | 126 |
| 35 | 13 | 1.6 | 96 | 57 |
| 36 | 14 | 2.1 | 96 | 38 |
| 37 | 15 | 2.1 | 98 | 20 |
| 38 | 16 | 2.1 | 97 | 27 |
| 39 | 17 | 2.1 | 96 | 22 |
| 40 | 18 | 2.1 | 93 | 48 |
| 41 | 19 | 2.1 | 99 | 22 |

The compositions having a monoester/diester ratio lower than 1 are characterised by lower shine values and higher haze values.

The invention claimed is:

1. A composition comprising:
   at least one (poly)isocyanate;
   at least one surfactant comprising an amine based on the following formula (III-1):

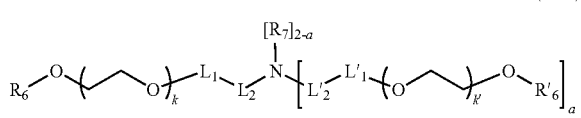

in which:
   a is equal to 0, 1 or 2;
   $R_7$ represents a hydrogen atom or a hydrocarbon chain; and when a=0 the $R_7$ groups may be the same or different and may optionally form a cyclic structure comprising from 3 to 5 carbon atoms;
   $R_6$ and $R'_6$ are identical or different and represent a hydrogen atom or a hydrocarbon chain;
   k represents an integer greater than or equal to 1;
   k' represents an integer from 0 to 60;
   $L_1$ and $L'_1$ are the same or different and represent, independently, a radical of formula $-[-L'-O-]_t-$, t being an integer from 0 to 20, L' being a linear or branched alkylene radical comprising from 3 to 10 carbon atoms, L' groups being the same or different; and
   $L_2$ and $L'_2$ are the same or different and represent, independently, a linear or branched divalent alkylene radical
   and
   a mixture of compounds based on the following formulae (I-1) and (II-1):

in which:
   $R_1$ and $R_2$ are the same or different and represent, independently, a hydrocarbon chain optionally substituted;
   said mixture of compounds of formulae (I-1) and (II-1) being characterised in that the molar ratio of compound (II-1) to compound (I-1) is greater than 1
   wherein at least one compound carrying at least one mobile hydrogen function is selected from the primary or secondary hydroxyl, phenol functions, primary and/or secondary amine functions, carboxylic functions and SH functions, and
   from 0% to 30% by weight organic solvent, relative to the total weight of the composition.

2. The composition of claim 1, wherein the composition comprises from 3 to 30% by weight surfactant and from 70 to 90% by weight (poly)isocyanate.

3. The composition claim 1, wherein the amount of amine used corresponds to the total neutralization of the first acidity of the mixture of compounds.

4. The composition of claim 1, wherein the (poly)isocyanate is a (poly)isocyanate selected from the homo- or heterocondensation products of alkylene diisocyanate.

5. The composition of claim 1, wherein the (poly)isocyanate is a (poly)isocyanate having an average functionality of isocyanate functions at least equal to 2 and at most equal to 20.

6. The composition of claim 1 wherein the amount of solvent in relation to the amount of the mixture formed by the surfactant system and the (poly)isocyanate is lower than 50% by weight, the solvent being selected from the group formed of esters, ethers, acetals, cyclic or linear carbonates, lactones, glycol or propylene glycol ethers and N-alkyl amides.

7. The composition of claim 1, comprising:
   from 10 to 60% by weight (poly)isocyanate, relative to the total weight of the composition without solvent, (% dry weight);
   from 0.25 to 12% by weight surfactant, relative to the total weight of the composition without solvent, (% dry weight); and
   from 30 to 80% by weight compound carrying at least one mobile hydrogen function, relative to the total weight of the composition without solvent (% dry weight).

8. The composition of claim 1, wherein the compound carrying at least one mobile hydrogen function is a polymer containing at least two hydroxyl functions (alcohol or phenol) and/or thiol functions and/or primary or secondary amine functions and/or containing precursor functions of the epoxy or carbonate type which, upon reaction with a suitable nucleophile, free the hydroxyl functions.

9. The composition of claim 1, wherein the average molecular weight in numbers of the compound carrying at least one mobile hydrogen function is between 100 and 100,000.

10. The composition of claim 1, wherein the compound carrying at least one mobile hydrogen function is a polyol selected from the acrylic or polyester or polyurethane polymers.

11. The composition of claim 10, wherein the polyol has a functionality of mobile hydrogen groups at least equal to 2.

12. The composition of claim 11, wherein the polyol has a functionality of OH from 2 to 30.

13. The composition of claim 11, wherein the polyol has a functionality of OH from 2 to 10.

14. A process for preparing a composition according to claim 1, comprising a step of mixing the compounds of formulae (I-1) and (II-1), the amine and the (poly)isocyanate.

15. A process for producing a coated substrate, characterised in that it comprises a step of applying a composition according to claim 1 to a substrate and a step of cross-linking by thermal treatment of said composition.

16. A coated substrate obtained by the process according to claim 15.

* * * * *